(12) United States Patent
Moss et al.

(10) Patent No.: US 6,546,712 B2
(45) Date of Patent: Apr. 15, 2003

(54) SYSTEM FOR THE REVERSE OSCILLATING LAY (ROL) CONSISTENCY DURING THE OPTICAL FIBER CABLE MANUFACTURING PROCESS

(75) Inventors: Parry A. Moss, Stone Mountain, GA (US); Wayne M. Newton, Lilburn, GA (US); Eugene R. Rusiecki, Alpharetta, GA (US); Mark I. Shmukler, Tucker, GA (US); Carla G. Wilson, Conyers, GA (US)

(73) Assignee: Fitel USA Corporation, Norcross, GA (US)

( * ) Notice: Subject to any disclaimer, the term of this patent is extended or adjusted under 35 U.S.C. 154(b) by 30 days.

(21) Appl. No.: 09/834,021

(22) Filed: Apr. 12, 2001

(65) Prior Publication Data

US 2002/0157375 A1 Oct. 31, 2002

(51) Int. Cl.[7] .................................................. B29F 3/10
(52) U.S. Cl. ............................ 57/293; 57/13; 57/93; 57/58.86; 57/264; 242/413.5
(58) Field of Search ..................... 57/293, 13, 264, 57/58.86, 93; 242/413.5

(56) References Cited

U.S. PATENT DOCUMENTS

| | | | |
|---|---|---|---|
| 4,372,535 A | * 2/1983 | Gibson et al. | 254/134.3 R |
| 5,277,373 A | * 1/1994 | Morton | 242/45 |
| 5,535,579 A | * 7/1996 | Berry, III et al. | 57/13 |

* cited by examiner

Primary Examiner—Danny Worrell
Assistant Examiner—Shaun R Hurley
(74) Attorney, Agent, or Firm—Thomas, Kayden, Horstemeyer & Risley, LLP

(57) ABSTRACT

A method, apparatus and system for improving reverse oscillating lay (ROL) consistency during an optical cable manufacturing process. A torque capstan receives an optical fiber cable from an ROL machine that places reverse-oscillating lay on the core of an optical cable, but also generates some undesirable fluctuating back-tension in a direction opposite a direction in which the optical fiber cable is being pulled during manufacturing of the optical cable. The optical cable comprises a plurality of subunit cables. A drive system coupled to the torque capstan is controlled by a control system in such a way that the torque capstan applies a certain amount of force to the optical cable in a direction substantially parallel to the direction in which the optical cable is being pulled during manufacturing. The certain amount of force applied to the optical fiber cable reduces undesirable fluctuating back-tension placed on the optical cable during the manufacturing process, thereby improving reverse oscillating lay (ROL) consistency, which improves the quality of the manufactured optical cables.

15 Claims, 5 Drawing Sheets

SYSTEM FOR THE REVERSE OSCILLATING LAY (ROL) CONSISTENCY DURING THE OPTICAL FIBER CABLE MANUFACTURING PROCESS

TECHNICAL FIELD OF THE INVENTION

The present invention generally relates to manufacturing optical fiber cables and, more particularly, to improving the consistency of the reverse oscillating lay of the cables during the manufacturing process to thereby improve the quality of the cables and prevent them from failing during use.

BACKGROUND OF THE INVENTION

It is known in the optical fiber cable manufacturing industry that reverse oscillating lay (ROL) inconsistency during the cable manufacturing process, particularly in regard to high-fiber-count (HFC) cables, results in non-uniform distribution of the mechanical load and stress on the cable throughout its entire length. This non-uniform distribution of mechanical load/stress on the cable during the manufacturing process often results in the cable exhibiting high optical loss during mechanical and environmental qualification tests, which is regarded as a failure in the cable.

FIG. 1 is an ROL machine of the type that is typically used during the HFC cable manufacturing process to reduce the non-uniform distribution of mechanical load/stress (hereinafter referred to solely as "stress") on the cable as it is being manufactured. A HFC cable is a cable that comprises a plurality of subunits 1, typically three to twelve, each of which comprises a plurality of coated optical fibers (not shown). During the HFC cable manufacturing process, the subunits 1 of the HFC cable are pulled through holes 2 formed in a series of reverse oscillating plates 3 as adjacent reverse oscillating plates are rotated in the same direction, but at incrementally increasing angles of rotation. At a particular point during the rotations of any two adjacent plates 3, a predetermined amount of twist is added to the core of the HFC cable. At this point, the direction in which each of the plates is being rotated reverses, and the plates rotate oppositely until the same amount of twist has been added to the core of the HFC cable in the opposite direction. The twisting of the HFC cable in this manner as it is being pulled is intended to equalize the distribution of stress on the cable over its length.

In current practices, after the HFC cable exits the ROL machine, the HFC cable generally is pulled through, respectively, a powder machine (for certain type of cables), a set of torsion rolls, which helps to keep the subunits 1 together, an extruder, a water trough and a main capstan. The extruder extrudes a material onto the cable that is to form the outer jacket of the cable. The water trough cools and solidifies the extruded material to form the outer jacket, which bundles and holds the subunits 1 of the HFC cable together. The cable is then pulled through the main capstan. The main capstan is monitored by a feedback system that controls the speed of the main capstan to control the speed at which the cable is pulled along the manufacturing line.

One of the problems associated with this HFC manufacturing technique is that it does not ensure that ROL is consistently maintained. Once the cable passes through the extruder, there is nothing to maintain the ROL, which often times results in the cable failing during testing or usage.

SUMMARY OF THE INVENTION

Accordingly, a need exists for a method, an apparatus and a system for ensuring that the ROL is consistently maintained during the manufacturing process, thereby decreasing or eliminating the amount of cable that is flawed due to inconsistent ROL. In accordance with the present invention, a method, apparatus and system are provided for improving ROL consistency during an optical fiber cable manufacturing process. The apparatus of the present invention comprises a torque capstan that receives an optical fiber cable from an ROL machine that places reverse-oscillating lay on the core of an optical fiber cable, but also generates some undesirable fluctuating back-tension in a direction opposite a direction in which the optical fiber cable is being pulled during optical cable manufacturing. The optical fiber cable comprises a plurality of subunit cables. A drive system of the apparatus is coupled to the torque capstan and controls the torque capstan. The drive system is controlled by a control system of the apparatus to cause the torque capstan to apply a certain amount of force to the optical fiber cable in a direction substantially parallel to the direction in which the optical fiber cable is being pulled during the optical fiber manufacturing process. The certain amount of force applied to the optical fiber cable by the torque capstan reduces back-tension on the optical fiber cable to enable ROL consistency to be maintained during the optical fiber cable manufacturing process.

The system of the present invention comprises the utilization of the apparatus of the present invention in combination with the method of the present invention in accordance with the preferred embodiment to reduce back-tension on the optical fiber cable in order to maintain ROL consistency.

The method of the present invention comprises the steps of delivering an optical fiber cable from a reverse oscillating lay (ROL) machine to a torque capstan, and utilizing a control system to control a drive system that is coupled to the torque capstan to cause the torque capstan to apply a certain amount of force to the optical fiber cable in a direction substantially parallel to the direction in which the optical fiber cable is being pulled, thereby reducing back-tension on the optical fiber cable in order to maintain ROL consistency.

These and other features and advantages of the present invention will become apparent from the following description, drawings and claims.

DETAILED DESCRIPTION OF THE INVENTION

In accordance with the present invention, it has been determined through experimentation and analysis that excessive back tension in HFC cable and significant periodical fluctuations of the tension force amplitude result in ROL inconsistency and ineffectiveness in lay capturing. The present invention enables the entire ROL process to be precisely controlled such that the mechanical strength of the cable is maximized and cable uniformity is achieved.

Figure 1:
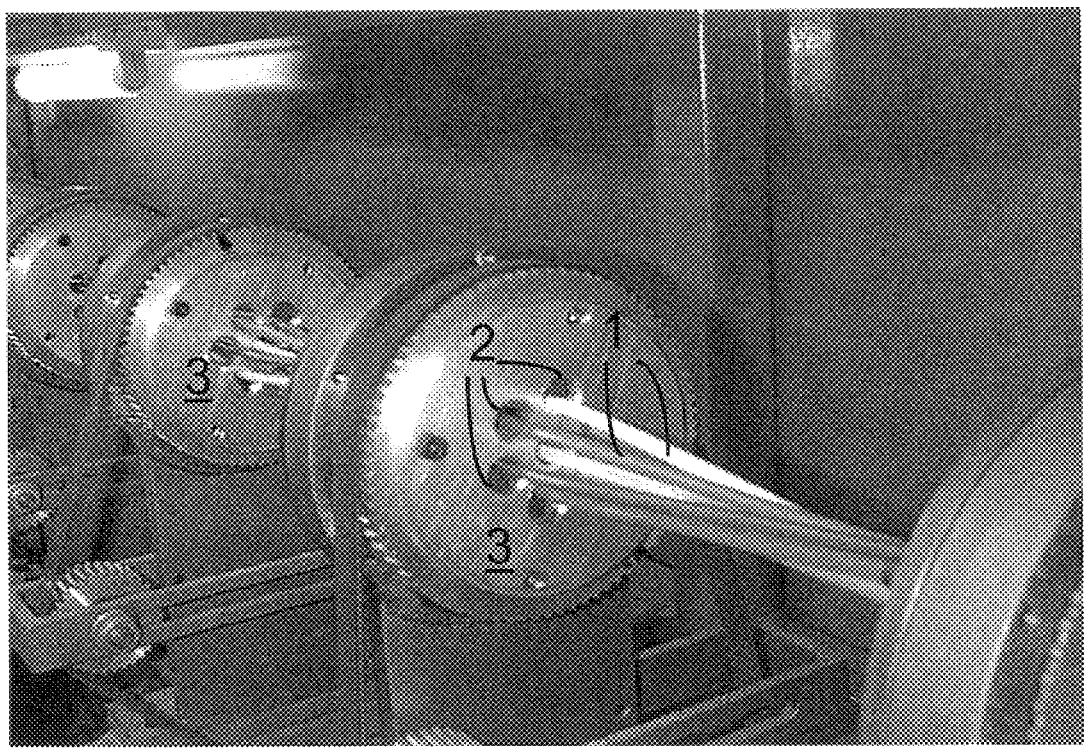
FIG. 1 is pictorial representation of an ROL machine of the type that is typically used during the HFC cable manufacturing process to apply a reverse oscillating lay to the core of the cable as it being manufactured in order to equalize mechanical load/stress throughout the cable as it is being put on a reel or bent/twisted during qualification testing or at during installation.
Figure 2:
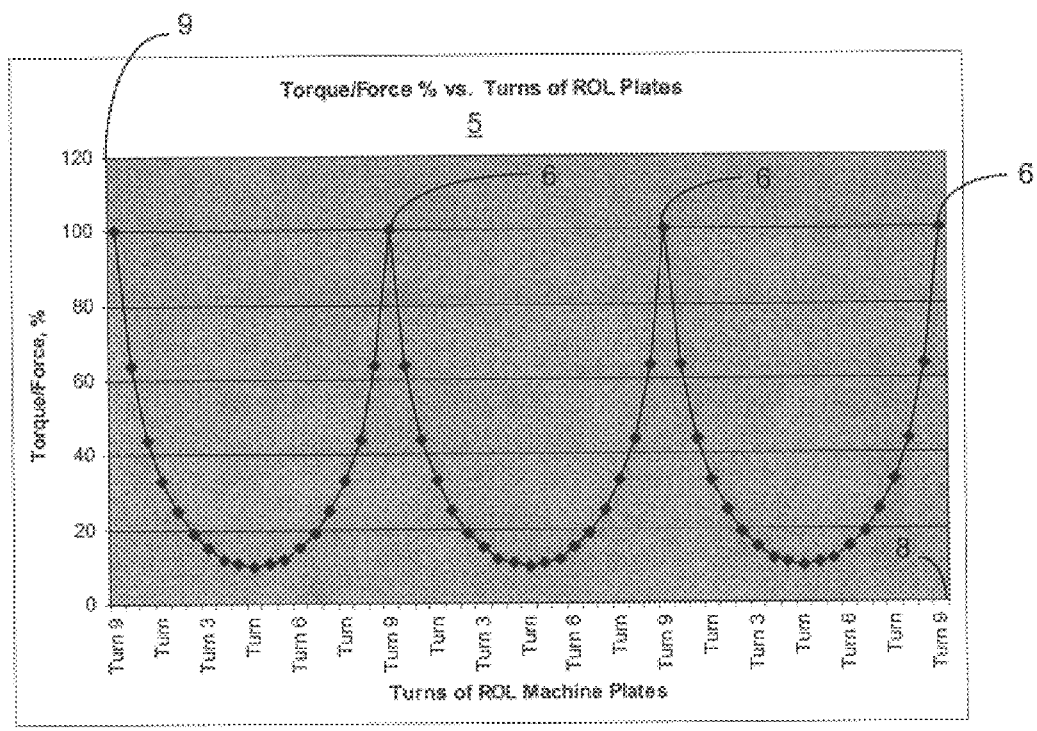
FIG. 2 is a graph illustrating the relationship between the amount of back-tension force, shown in terms of torque/force % (vertical axis) placed on the cable and the number of turns (horizontal axis) of the ROL plates when the present invention is not implemented.
Figure 3:
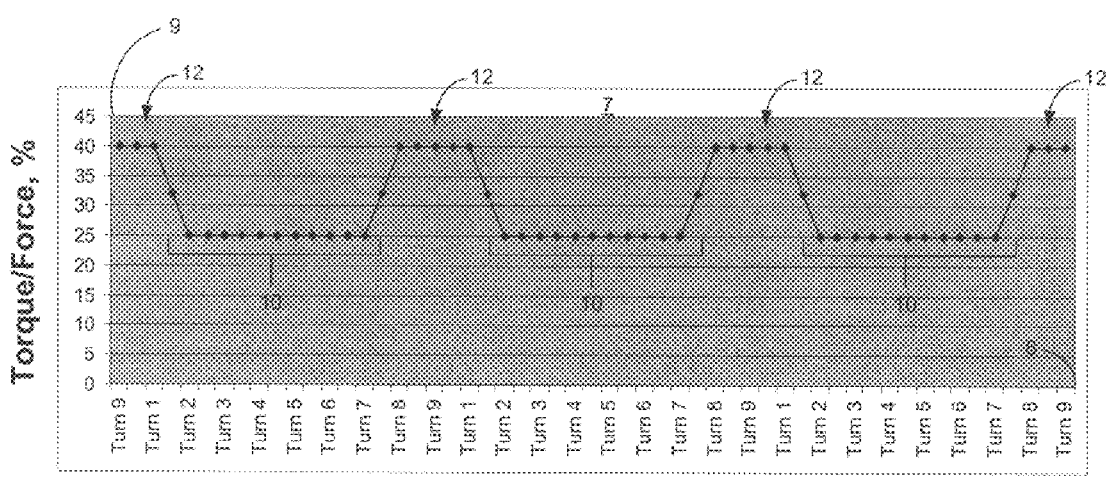
FIG. 3 is a graph that illustrates the results of utilizing the system, method and apparatus of the present invention, i.e., significantly reducing back-tension, which, in turn, improves ROL consistency, and thus, cable quality.

FIG. 2 is a graph 5 illustrating the relationship between the amount of back-tension force, shown in terms of torque/force % (vertical axis 9) placed on the cable and the number of turns (horizontal axis 8) of the ROL plates 3 when the present invention is not implemented. The back-tension force is greatest at the upper apexes, which are designated by the numeral 6. FIG. 3 is a graph 7 that illustrates the results of utilizing the system, method and apparatus of the present invention, i.e., significantly reducing back-tension in order to improve ROL consistency, which results in higher cable quality. A comparison of FIGS. 2 and 3 shows that, for the same turns of the plates (shown on the horizontal axis 8), the back-tension (shown on the vertical axis 9 in terms of torque/force percentage) is significantly less overall, and that periodical fluctuations of the tension force amplitude are significantly reduced. The overall reduction in back-tension is evident from the fact that the maximum back tension in terms of torque/force % is 40. The reduction in periodical fluctuations of the tension force amplitude is evident from the fact that the maximum torque/force % differential at any given time is 15 and from the fact that the lower and upper apexes 10 and 12, respectively, are constant over a number of turns and are flat. The manner in which these results are achieved will now be discussed with reference to FIG. 4.

Figure 4:
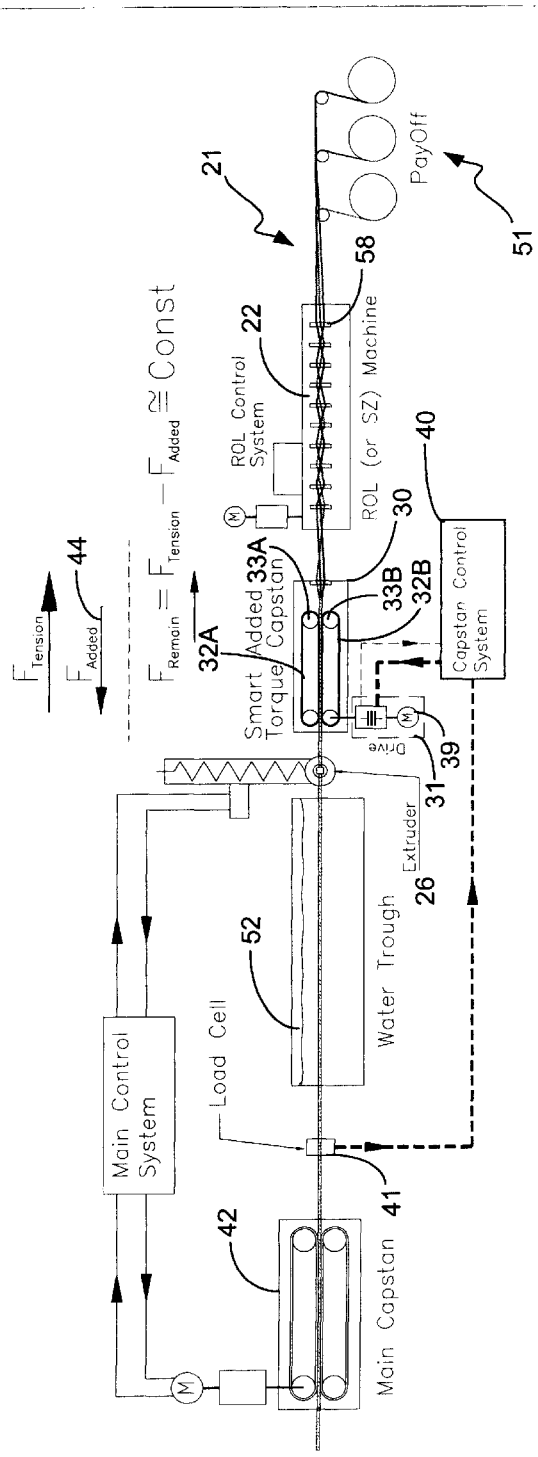
FIG. 4 is a block diagram of the system of the present invention in accordance with one embodiment for minimizing or eliminating undesirable excessive back-tension in a cable during a cable manufacturing process.

FIG. 4 is a block diagram of the system 20 of the present invention. The present invention causes a pushing force/torque (hereinafter referred to as "pushing force") to be generated on a HFC cable 21 being manufactured, which minimizes or eliminates undesirable excessive back-tension in the section of HFC cable between the extruder 26 and the main capstan 42. The amount of back-tension placed on the cable 21 periodically fluctuates due to the relative orientation of each rotating plate of the ROL machine 22. Also, some minimum optimum amount of tension should be maintained on the cable as it enters the extruder 26. Therefore, one of the goals of the present invention is to precisely control the amount of the pushing force generated such that the remaining amount of tension is kept constant at a certain minimum desired or required level.

In order to perform these functions, the system of the present invention utilizes a "smart" capstan 30, in conjunction with a capstan feedback control system 40 that controls the capstan 30 to reduce and equalize the amount of fluctuating back-tension, thereby maintaining the overall tension on the cable at some minimum, optimum constant level. The smart capstan 30 comprises an electrical programmable drive 31, an upper driven belt 32A, a lower drive belt 32B, an upper pulleys assembly 33A and a lower pulleys assembly 33B. The electrical programmable drive 31 is controlled by the capstan feedback control system 40. The smart capstan 30 also preferably comprises one or more pneumatic cylinders (FIG. 5) that are controlled by the capstan feedback control system 40, or optionally, by way of Line Operator interference initiated from a control panel (not shown). The pneumatic cylinders provide all linear motions of the upper and lower driven belts 32A, 32B, such as, for example, belt stretching, vertical belt motion and clamping the core of the cable. A servomotor 39 of the drive 31 generates a certain amount of torque and transforms the torque into the aforementioned pushing force by controlling the rotation of the lower drive belt 32B of the capstan 30. This extra force directed toward the extruder 26 compensates for the fluctuating back-tension created by the ROL machine 22 and the Sub-Unit PayOff 51. Feedback signal output from the capstan feedback control system 40 to the electrical programmable drive 31 causes the drive 31 to change the amount of torque generated by the servomotor 39. In turn, this change in torque changes the value of the additional pushing force provided by the belts 32A and 32B and applied directly to the core of the cable, thus equalizing the back tension.

It should be noted that there are many ways to control the operation of the smart capstan 30 to cause it to produce the amount of extra torque/force needed to equalize the fluctuating back-tension. The present invention is not limited in any way to any particular configuration. Those skilled in the art will understand, in view of the discussion provided herein, that there are many ways in which the capstan and drive can be constructed to achieve the objectives of the present invention.

The capstan feedback control system 40 comprises a sensor 41 that preferably is located on the opposite side of the water trough 43 from the capstan 30. The sensor 41 senses the tension in the cable and generates signals that are utilized by the capstan feedback control system 40 to control the drive 31, which, in turn, causes the capstan 30 to generate the proper amount of additional torque/force in the direction indicated by arrow 44 to maintain the back-tension at a constant, or substantially constant, level represented by $F_{Remain}$ in FIG. 4. Furthermore, the feedback control system 40 of the capstan 30 preferably constantly monitors the motion speed of belts at the main capstan 42. The feedback control system 40 controls the belts of the capstan 30 in a such way that the speed of the capstan 30 preferably is always related to the speed of the main capstan 42, and, ideally, matches it.

Figure 5:
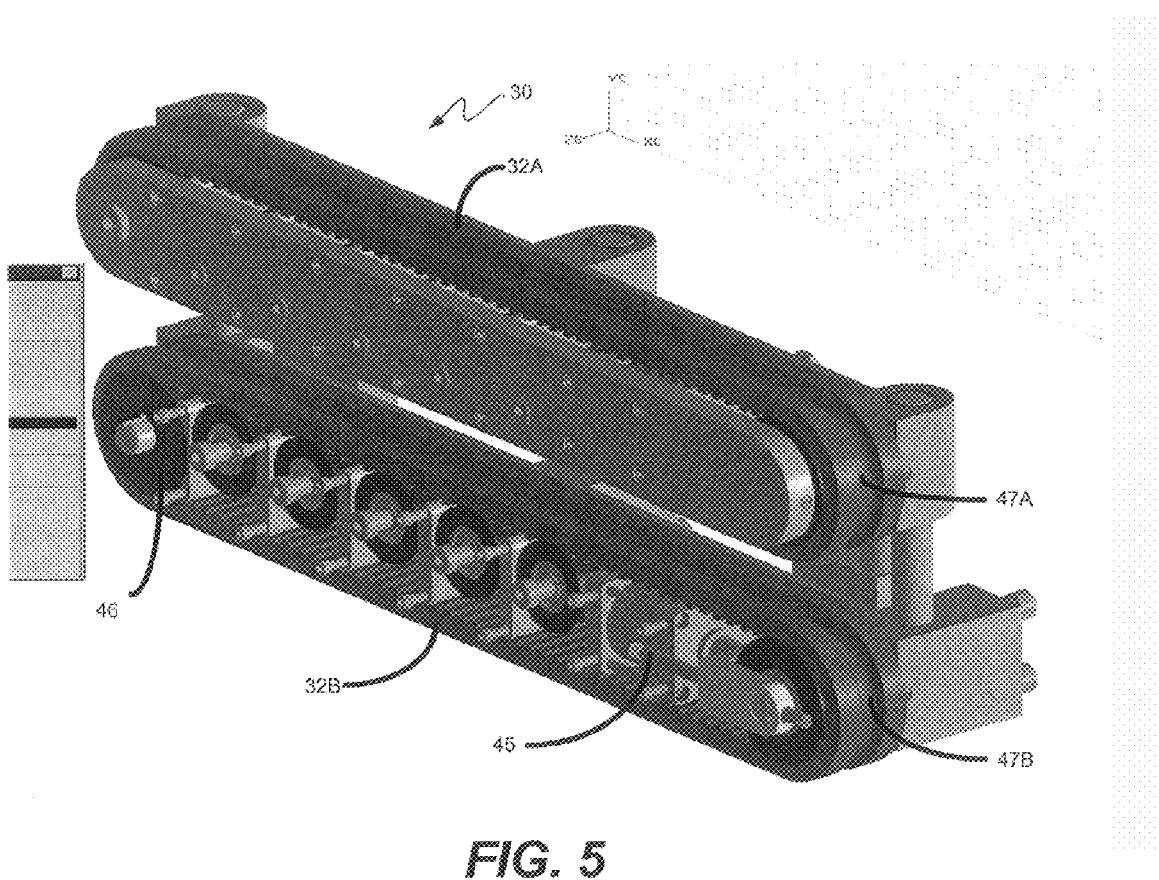
FIG. 5 is an isometric view showing a configuration of the capstan of the present invention in accordance with one embodiment.

FIG. 5 is an isometric view showing the configuration of the capstan of the present invention in accordance with one embodiment. Items 45 and 46 represent the aforementioned pneumatic cylinder and drive pulley, respectively. Preferably, the upper and lower driven belts 32A and 32B have half-round grooves 47A and 47B, respectively, formed in them. The driven belts 32A and 32B preferably are comprised of a high-friction neoprene material with precisely calculated and machined half-round grooves. The grooves 47A, 47B are designed such that the core of the cable (not shown) fits tightly within the grooves 47A, 47B. However, the driven belts 32A, 32B could be of the type normally implemented in torque capstans, in which case the driven belts 32A, 32B would not have the grooves 47A, 47B shown in FIG. 5. The grooves 47A, 47B are preferred because they facilitate precise control of the amount of torque added to offset the fluctuating back-tension while maintaining the round shape of the cable core.

During the manufacturing process, as soon as the core of the cable leaves a slave plate (not shown) that repeats the rotation of the last plate of the ROL machine 22, the cable passes through a closing die (not shown) and then into the capstan 30. The belts 32A, 32B are pressed toward each other and the cable is "grabbed" by the belts 32A, 32B in a friction fit as it enters the back end 48 of the capstan and dragged through the capstan 30 to the forward end 49. Torque generated by the servomotor 39 creates a horizontal pushing force that is applied to the core of the cable and directed toward the extruder 26 and water trough 52. This pushing force compensates for, or neutralizes, the undesirable back-tension created by the ROL machine 42 and Sub-Unit PayOff system 51.

The sensor 41 preferably is comprised of a load cell and supporting structure. The sensor 41 constantly monitors the amount of remaining tension (i.e., tension remaining after offset) in the cable. The major component of the back-tension is due to the ROL machine 42 and changes periodically as a result of the relational orientation of the ROL plates 58. The sensor 41 detects any deviation in the tension amplitude from the desired value. As stated above, the sensor 41 sends the corresponding signal to the capstan feedback control system, which, if necessary, changes the amount of torque generated by the servomotor 39, thus forcing the tension in the cable to remain constant, or substantially constant, and at the required level.

It should be noted that although the present invention has been described with respect to particular embodiments, the present invention is not limited to the embodiments described herein. Those skilled in the art will understand, in view of the discussion provided herein, that modifications can be made to the embodiments described that are within the scope of the present invention. For example, there are many ways to create a suitable feedback system to control the smart capstan 30. Likewise, the are many ways to construct a capstan that is suitable for the uses described above with reference to FIG. 4. Similarly, there are many different types of sensors that are suitable for performing the functions performed by the sensor 41.

What is claimed is:

1. An apparatus for improving reverse oscillating lay (ROL) consistency of an optical fiber cable received from a reverse oscillating lay (ROL) machine during an optical fiber cable manufacturing process, the apparatus comprising:

a torque capstan, the torque capstan receiving an optical fiber cable from a reverse oscillating lay (ROL) machine, the optical fiber cable comprising a plurality of subunit cables, the ROL machine placing reverse-oscillating lay on the core of the optical fiber cable, but also generating undesirable fluctuating back-tension in a direction opposite a direction in which the optical fiber cable is being pulled during the optical cable manufacturing process;

a drive system coupled to the torque capstan; and a control system in communication with the drive system, the control system controlling the drive system such that the torque capstan forces the optical fiber cable in a direction substantially parallel to the direction in which the optical fiber cable is being pulled during the optical fiber cable manufacturing process, and wherein the force applied to the optical fiber cable by the torque capstan reduces said undesirable fluctuating back-tension on the optical fiber cable, wherein the control system controls the drive system in accordance with Line Operator interference signals delivered to the control system.

2. An apparatus for improving reverse oscillating lay (ROL) consistency of an optical fiber cable received from a reverse oscillating lay (ROL) machine during an optical fiber cable manufacturing process, the apparatus comprising:

a torque capstan, the torque capstan receiving an optical fiber cable from a reverse oscillating lay (ROL) machine, the optical fiber cable comprising a plurality of subunit cables, the ROL machine placing reverse-oscillating lay on the core of the optical fiber cable, but also generating undesirable fluctuating back-tension in a direction opposite a direction in which the optical fiber cable is being pulled during the optical cable manufacturing process;

a drive system coupled to the torque capstan; and a control system in communication with the drive system, the control system controlling the drive system such that the torque capstan forces the optical fiber cable in a direction substantially parallel to the direction in which the optical fiber cable is being pulled during the optical fiber cable manufacturing process, and wherein the force applied to the optical fiber cable by the torque capstan reduces said undesirable fluctuating back-tension on the optical fiber cable, the control system being an automatic feedback control system, the automatic feedback control system comprising a sensor located downstream of the torque capstan with respect to the direction in which the optical fiber cable is being pulled, wherein the sensor senses an amount of back-tension on the optical fiber cable at the location of the sensor and produces one or more signals relating to the amount of sensed back-tension, the automatic feedback control system controlling the drive system in accordance with said one or more signals produced by the sensor.

3. The apparatus of claim 2, wherein the optical fiber cable is a high fiber count (HFC) cable.

4. The apparatus of claim 2, wherein the undesirable fluctuating back tension on the optical fiber cable is created in part by the ROL machine and in part by a subunit payoff system that unreels the subunits comprised by the optical fiber cable before the subunits are pulled into the ROL machine.

5. The apparatus of claim 2, wherein the undesirable fluctuating back-tension is reduced by an amount calculated to reduce an overall amount of back tension on the optical cable to a constant level.

6. A system for improving reverse oscillating lay (ROL) consistency of an optical fiber cable during an optical fiber cable manufacturing process, the system comprising:

a subunit payoff system unreeling a plurality of subunit cables, the subunit cables together comprising an optical fiber cable;

an ROL machine, the ROL machine receiving the subunit cables unreeled from the ROL machine, the ROL machine placing reverse-oscillating lay on the core of an optical fiber cable as the subunit cables are pulled through the ROL machine;

a torque capstan, the torque capstan receiving the optical fiber cable from the ROL machine;

a drive system coupled to the torque capstan; and an automatic feedback control system in communication with the drive system, the automatic feedback control system comprising a sensor located downstream of the torque capstan with respect to the direction in which the optical fiber cable is being pulled during optical fiber cable manufacturing, wherein the sensor senses an amount of overall back-tension on the optical fiber cable at the location of the sensor and produces one or more signals relating to the amount of sensed overall back-tension, and wherein the automatic feedback control system controls the drive system in accordance with the signals produced by the sensor such that the torque capstan forces the optical fiber cable in a direction substantially parallel to the direction in which the optical fiber cable is being pulled during manufacturing of the optical fiber cable, and wherein the force applied to the optical fiber cable by the torque capstan reduces any undesirable fluctuating back-tension on the optical fiber cable caused by at least one of the ROL machine and the subunit payoff system.

7. The system of claim 6, wherein the optical fiber cable is a high fiber count (HFC) cable.

8. The system of claim 6, wherein any of said undesirable fluctuating back-tension on the optical fiber cable is caused by said subunit payoff system and by said ROL machine.

9. The system of claim 6, wherein the automatic feedback control controls the drive system such that the undesirable fluctuating back-tension and overall back-tension are reduced and ROL consistency is maintained.

10. A method for improving reverse oscillating lay (ROL) consistency of an optical fiber cable during an optical cable manufacturing process, the method comprising:

delivering an optical fiber cable from a reverse oscillating lay (ROL) machine to a torque capstan, the optical fiber cable comprising a plurality of subunit cables, the ROL machine placing reverse-oscillating lay on the core of an optical fiber cable, but also generating some undesirable fluctuating back-tension in a direction opposite a direction in which the optical fiber cable is being pulled during manufacturing of the optical fiber cable; and utilizing a control system to control a drive system that is coupled to the torque capstan such that the torque capstan forces the optical fiber cable in a direction substantially parallel to the direction in which the optical fiber cable is being pulled, and wherein the force applied to the optical fiber cable reduces the undesirable fluctuating back-tension on the optical cable.

11. The method of claim 10, wherein the control system controls the drive system in accordance with Line Operator interference signals delivered to the control system.

12. The method of claim 10, wherein the control system is an automatic feedback control system, the automatic feedback control system comprising a sensor located downstream of the torque capstan with respect to the direction in which the optical fiber cable is being pulled, and wherein the utilizing step includes:

utilizing the sensor to sense an amount of overall back-tension on the optical fiber cable at the location of the sensor and to produce one or more signals relating to the amount of sensed back-tension; and controlling the drive system in accordance with the signals produced by the sensor to reduce said undesirable fluctuating back-tension.

13. The method of claim 10, wherein the optical fiber cable delivered from the ROL machine to the torque capstan is a high fiber count (HFC) cable.

14. The method of claim 10, wherein a subunit payoff system that unreels the subunits comprised by the optical fiber cable prior to the subunit cables being pulled into the ROL machine component causes the undesirable fluctuating back-tension on the optical fiber cable.

15. The method of claim 10, wherein utilizing a control system response, the undesirable fluctuating back-tension is reduced by an amount calculated to reduce an overall amount of back-tension on the optical cable to a constant level such that ROL consistency is maintained.

* * * * *